March 14, 1961 — T. F. W. MEYER — 2,974,983
DEVICE FOR WIPING OR SCRAPING A WORKING MEMBER
Filed Feb. 23, 1956 — 3 Sheets-Sheet 1

INVENTOR.
THEODORE F. W. MEYER
BY
ATTORNEYS.

March 14, 1961 T. F. W. MEYER 2,974,983
DEVICE FOR WIPING OR SCRAPING A WORKING MEMBER
Filed Feb. 23, 1956 3 Sheets-Sheet 2

INVENTOR.
THEODORE F. W. MEYER
BY
Barnes Kisselle Laughlin & Raisch
ATTORNEYS

March 14, 1961 T. F. W. MEYER 2,974,983
DEVICE FOR WIPING OR SCRAPING A WORKING MEMBER
Filed Feb. 23, 1956 3 Sheets-Sheet 3

INVENTOR.
THEODORE F. W. MEYER
BY
Barnes Kisselle Laughlin & Raisch
ATTORNEYS.

United States Patent Office 2,974,983
Patented Mar. 14, 1961

2,974,983
DEVICE FOR WIPING OR SCRAPING A WORKING MEMBER

Theodore F. W. Meyer, Delray Beach, Fla., assignor to Equi-Flex Products, Incorporated, Detroit, Mich., a corporation of Michigan Filed Feb. 23, 1956, Ser. No. 567,215

11 Claims. (Cl. 286—12)

This invention relates to devices to be interposed between relatively movable members and particularly members which have relative reciprocal movement for the purpose of preventing extraneous material from entering the linear journal area.

There are many forms of mechanisms which employ members which have relative reciprocal movement such, for example, as hydraulically and pneumatically actuated mechanisms, piston rods movable into and out of a cylinder, guide rods or columns, push-pull control rods, hydraulic steering mechanisms for automobiles, shock absorbers for automobiles, welding equipment, many installations in airplanes including the hydraulically actuated struts for ground engaging wheels, periscope and radar masks, catapults, and innumerable other telescoping and reciprocating arrangements. This invention relates more particularly to what may be termed a wiper or scraper of such a construction as to completely circumflex a reciprocable member and to yieldably engage and wipe the same thereby stripping and removing therefrom extraneous materials, such as dust, dirt, grit, chips, ice or other coagulations or adhesions which may have adhered thereto during a period of exposure. Unless such material is removed, such material is carried into the journal area as the two members of the mechanism telescope together resulting in deleterious abrasion, scoring, wear, and friction and otherwise impedes free relative reciprocable motion.

In accordance with the invention a wiping or scraping device is provided which will yieldably engage a reciprocable member uninterruptedly 360° circumferentially and which will have a relatively low "breakaway" and dynamic friction. One object of the invention is to provide a device which will circumflex a reciprocating member but which is inherently responsive to deviations due to permissible tolerances, etc., thus reducing the necessity of extreme high accuracy in initially fashioning the wiped member and on which, in itself, within practical limits, is self-adjusting to wear, temperature fluctuations and other variables which influence the fitting engagement.

In accordance with the invention, a wiper or scraper element is provided to yieldably circumflex the member wiped or scraped and this member is carried by or supported by a body of elastomer mounted in the member which is reciprocable relative to the member wiped or scraped. This member may be of rubber, either natural or synthetic, or a suitable plastic and the term "elastomer" is used in the sense of covering all such substances. In some installations, the wiper member may be used without the elastomer carrier.

The device is herein described as a wiper or scraper. These are terms often employed by those skilled in the art and are employed herein without intending that the term be delimiting. While the device of this invention is intended primarily for use in conjunction with a member which moves relatively linearly or axially, there may be instances where it is applicable for use between two members which have only relative rotary movement.

The accompanying drawings show devices constructed in accordance with this invention.

Figure 1:
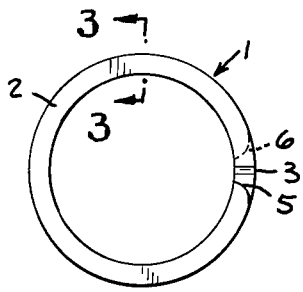
Fig. 1 is a side view of a wiper element.
Figure 2:
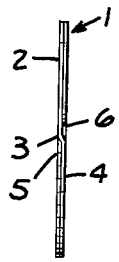
Fig. 2 is an edge view of the wiper element.
Figure 3:
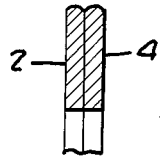
Fig. 3 is an enlarged cross sectional view through the wiper element.
Figure 4:
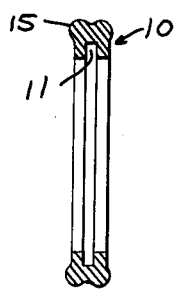
Fig. 4 is a cross sectional view of the elastomer holder or envelope.
Figure 5:
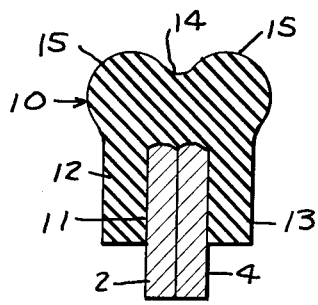
Fig. 5 is an enlarged cross sectional view taken through the holder.

The wiper or scraper member, as illustrated in Figs. 1, 2 and 3, is shown as a single piece of material, the width of which is preferably greater than its thickness and it is fashioned or formed into an annular shape having an excess of one complete convolution of 360°. As shown the scraper member generally indicated at 1, is fashioned into a convolution 2 with an intermediate offset 3 and a convolution 4. The offset is of such dimensions that the interfaces of the convolutions 2 and 4 are normally in closed and preferably abutting relationship. The ends of the stock, as shown at 5 and 6, lie in close proximity to the offset 3. The inner peripheral edges are flat as shown in Fig. 3 with the corners sharp and square. The outer peripheral edges may be flat or slightly crowned. The convolutions each lie in a plane substantially at a right angle to the axis.

The material of which this scraper is made may vary depending somewhat upon where it is to be used and the conditions it is to encounter. The annulus is elastic and the normal interior diameter is slightly less than the rod member which is to pass through the wiper. As a result the wiper is expanded and tensioned when placed upon a member to be wiped and thus engages with yieldable action. The member is preferably relatively stiff and moderately hard and may be of steel, preferably of abrasion resistant characteristic, a cuprous or other alloy, such as beryllium copper, and may be bare metal, plated, rust-proofed, or otherwise superficially treated. This member may also be formed of suitable phenolic, polymeric or other synthetic composition.

The carrier or elastomer body is of annular form as generally indicated at 10. It has an annular recess 11 defining opposite legs 12 and 13. The bight portion is formed with a recess 14. At the intersection of the bight portion and the legs 12 and 13 the body is formed with bulbous convexities 15 thereby giving the elastomer body an axial dimension outwardly of the groove 11 greater than the axial dimension across the legs 12 and 13.

Figure 6A:
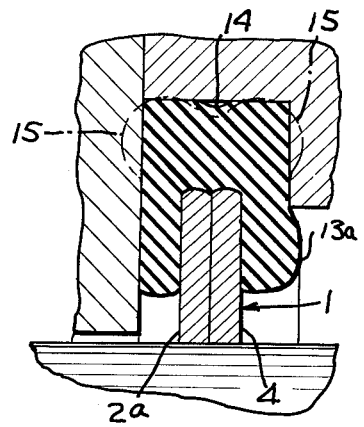
Fig. 6a is a sectional view diagrammatically illustrating the relationship of the holder and the cavity into which it is to be fitted.
Figure 6:
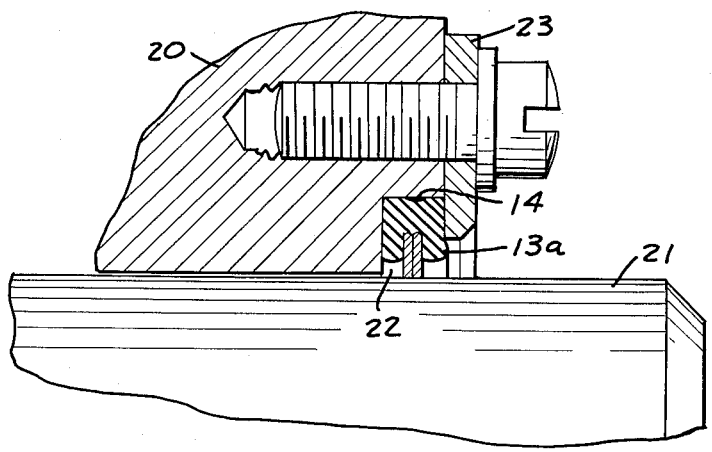
Fig. 6 is a cross sectional view illustrating an installation which employs the wiper.

The scraper is situated in the annular groove 11, as shown in Fig. 6, wherein one form of assembly is indicated. In this assembly, a member of the mechanism with which the device is to be used is indicated at 20 while a reciprocable rod member is shown at 21. Insofar as the invention is concerned, it makes no difference which member 20 or 21 actually reciprocates relative to the ground. In this installation, the body is engaged in a cavity 22 formed in the body 20 and partially closed by a clamp ring 23. The cavity 22 is of such dimensions that when the clamp ring is applied the elastomer body is distorted. The cavity 22, as indicated in Fig. 6a, is somewhat smaller than that which would receive the elastomer in its normal condition, the body being shown in dotted lines. When the clamp ring is positioned the elastomer is squeezed, so to speak, and distorted and some of the material flows into the void provided by the recess 14. The body is distorted mostly in its outer regions due to the convexities 15. Thus forces communicated to the scraper have components radially inwardly on the scraper thus aiding its constricting tendencies, with less components tending to squeeze the convolutions together by axial forces. The leg 13 may bulge outwardly as approximately indicated at 13a.

With this arrangement the elastomer flows into intimate sealing contact with both the wiper member and the confining walls of the cavity wherever respectively contiguous thereto. However, the void provided by the recess 14 is not completely filled with the displaced material. Thus, a tight seal is not only provided with the member 20 but the body exerts a confinement upon the wiper member to counter-act any probable distention forces caused by the rod 21. The body aids to sustain uniform circumflexion of the wiper about the rod to accommodate variations, tolerances, etc., and to uniformly circumferentially and radially support the wiper member against localized distortions.

Under dynamic conditions, any distention of the wiper member beyond its initial normal condition acts to further distort, displace and flow the elastomer body thereby providing the wiper member with adequate freedom for diametral expansion within practical limits. Visualizing inward movement, that is, a movement to the left as Fig. 6 is viewed, extraneous substances acquired by the rod when exposed are effectively stripped therefrom and its surface wiped of all deposits. In this movement there is an inward force on the wiper member against the leg 12 of the body and this thrust further tends to distort and displace the elastomer both inwardly and outwardly. Outward displacement will be towards the void at recess 14 with the result that there is an increased confinement of the wiper member acting towards increased contact pressure with the rod. This coincidentally reinforces the wiper member against distentions by wiped media striving to interpose itself between the wiper member and the rod. Whatever inwardly-directed displacement of the elastomer may occur under these conditions, broadens the base thereof and provides additional support of the wiper member. On the return stroke, there are no foreign substances to be removed and the thrust on the wiper member is largely of frictional origin and of insufficient magnitude to cause any major displacement of the elastomer. Commonly, therefore, the contact pressure between the wiper member and the rod returns to normal with correspondingly minimized friction.

However, it should be noted that the wiper is effective in this return or outward stroke, and the wiper, in many instances, may function as a lubricant retainer and prevent excessive loss of oil, grease, or the like, especially where the lubricant is under atmospheric pressure or relatively negligible gravity pressure.

It should be noted that the wiper member is encompassed and suspended within the elastomer body so that it has sufficient freedom of independent movement in all directions to permit it to freely self-center and self-align itself, within practical range, to any eccentric or axially angular misalignment and to distend and circumflex the rod freely and intimately without loss of intimate wiping contact, and without loss of the sealing relationship of the elastomer body in its encompassing capacity. Also, the wiper is self-adjusting to wear, within limits, and will thereby maintain its wiping efficiency in the presence of considerable wear.

Figure 7:
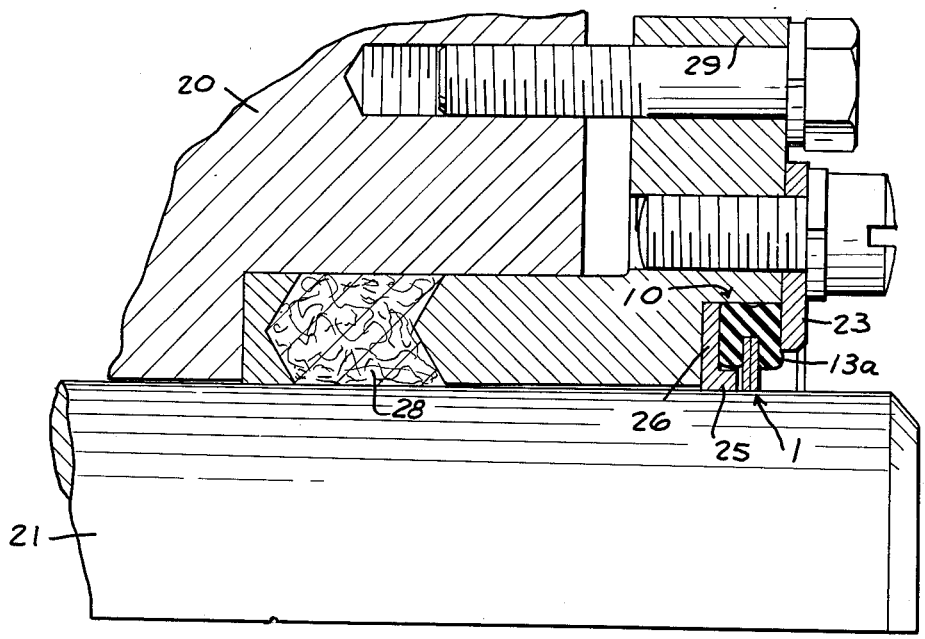
Fig. 7 is a sectional view of an installation illustrating a modified arrangement.

In the form shown in Fig. 7, parts substantially identical to those previously described have the same reference characters applied thereto so that redescription is unnecessary. In this form the cavity for the elastomer is provided with a limiting shoulder 25. This shoulder 25 may be carried by the insert ring or rod bearing 26. This form also indicates an arrangement showing a packing between the member 20 and the rod 21, the packing being illustrated at 28. This is accomplished by disposing packing material in a cavity and which is held tightly therein by an extension on a member 29, as is known to those versed in the art. The fact that this view shows the packing is entirely unrelated from the form of the wiper or scraper.

The wiper or scraper, as shown in Fig. 7, functions to wipe the rod as above described. However, the shoulder 25 provides a supplementary support for the wiper member against the force or thrust on the inward movement of the rod 21. As the rod 21 moves inwardly, that is, to the left as Fig. 7 is viewed, the wiper member may be forced to the left sufficiently to engage the shoulder 25. This limits the inward movement of the wiper and limits the displacement of the elastomer by such movement incident to the inward forces. Such an arrangement may be employed for heavy duty conditions where the inward thrust may exceed higher than normal thrust and thus excessive extrusion of the elastomer prevented.

Figure 8:
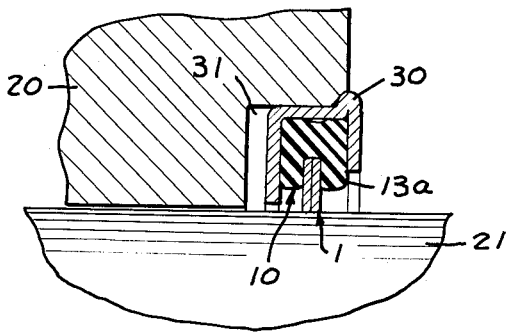
Fig. 8 is a sectional view illustrating an installation where the wiper is in the form of a complete sub-assembly or cartridge.

In Fig. 8 a form of sub-assembly or cartridge is shown. Here the wiper 1 and its body 10 are mounted in a sub-assembly and disposed in a retainer or casing 30. The elastomer body 10 is held under distortion by the casing and to mount the sub-assembly in position for acting upon the rod 21 it is only necessary to fit the casing in a cavity 31 of the member 20. The casing may be press fitted into position or may be otherwise held in position in any other suitable manner.

Figure 9:
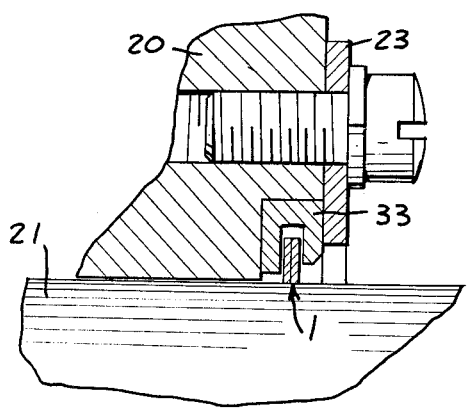
Fig. 9 is a sectional view illustrating a form where the holder or envelope is of rigid material.

In the form shown in Fig. 9, the wiper or scraper 1 is the same as previously described but it is held in a more or less free floating manner by a carrier or body 33 of material which maintains its geometric shape and which does not flow as does an elastomer. The wiper 1 fits relatively freely in the groove of the holder. This type of installation may suffice for some purposes where it is not necessary to have a seal with the body 20.

Figure 10:
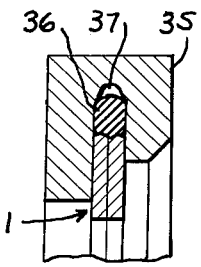
Figs. 10, 11, 12 and 13 are cross sectional views illustrating various modified forms of elastomer bodies.
Figure 11:
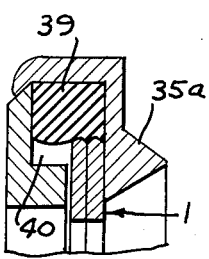
Figure 12:
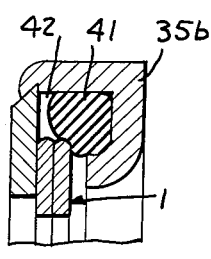
Figure 13:
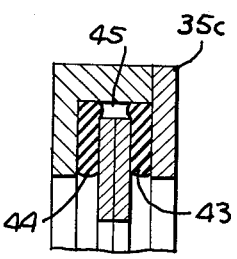

In the forms shown in Figs. 10 to 13 inclusive the wiper or scraper is the same as that heretofore described. In Fig. 10 the wiper 1 is disposed in the groove of the member 35 in a relatively free floating manner and the wiper is backed up to elastomer ring 36 which may be distorted and which may flow into the void 37 formed in the member 35. In Fig. 11 the elastomer ring 39 is contained in a cavity in a working member 35a and it extends axially relative to the wiper. When the elastomer body 39 is distorted it flows into the void 40. In the form shown in Fig. 12 the elastomer body 41 is in a recess of the working member 35b and when distorted flows into the void 42. The body 41 engages the wiper more or less at one outer peripheral edge. In Fig. 13 the working member 35c has a cavity for receiving the wiper and two elastomer rings 43 and 44. When these elastomer rings which together constitute the elastomer body are distorted the material flows into the void 45 in proximity to the outer periphery of the wiper.

Figure 15:
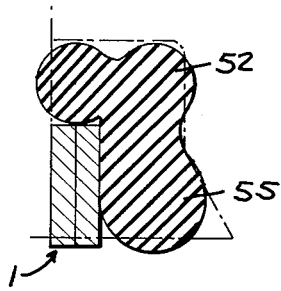
Fig. 15 is a sectional view similar to Fig. 14 illustrating diagrammatically the relationship of the elastomer holder and the cavity into which it is fitted.
Figure 14:
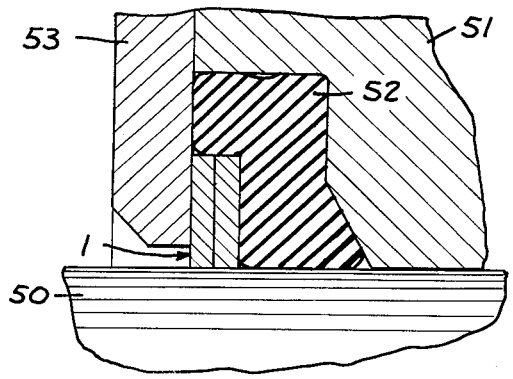
Fig. 14 is a view of an installation showing a combined wiper or scraper and seal.

Figs. 14 and 15 show an arrangement whereby there is a combined wiper or scraper and seal. For example, the rod 50 reciprocates relative to a suitable housing or casing 51 and the elastomer body 52 and the wiper 1 are confined in an area closed by a plate or ring 53. As indicated in Fig. 15, the cavity is such that the elastomer body must be distorted so that its outer regions engage and seal against the walls of the cavity and its inner portion 55 seals against the rod or shaft 50. Thus the wiper or scraper 1 removes extraneous material from the rod while at the same time a seal is provided by the engagement of the elastomer with the rod 50.

Figure 16:
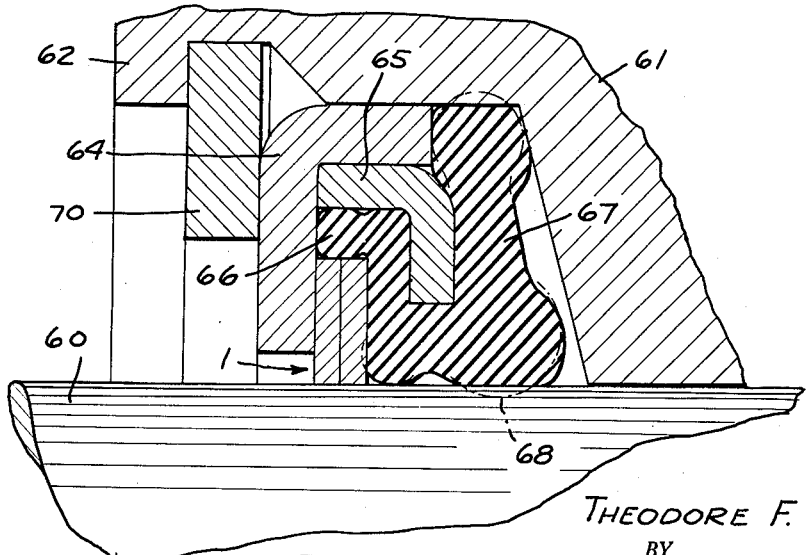
Fig. 16 is a cross sectional view of an installation illustrating a combined wiper and seal of sub-assembly of capsule form.

Fig. 16 shows an arrangement where a combined wiper and seal is constructed as a sub-assembly or cartridge form. The reciprocating shaft is shown at 60, the body at 61, formed with a recess and an overhanging flange 62 which may be a separate clamping plate or ring. The sub-assembly is constituted by a ring 64 of metal or the like of L-shape in cross section and another ring 65 of metal or the like which may be press fitted into the ring 64. The elastomer body has a portion 66 shaped to lie radially outwardly of the wiper 1 and to hold the wiper against the flange of the ring 64. The elastomer body has another portion 67 which engages in the recess in the member 61, and also engages and seals as at 68 with the shaft 60. Accordingly, although the portion 66 of the elastomer body is more or less confined between the portions of the rings 64 and 65 the portion 67 is exposed so that when put in position in the recess it engages the walls thereof and also the shaft 60. This sub-assembly may be held in position by a snap ring 70 engageable behind the shoulder 62.

I claim:

1. In combination with two working elements, one of which is in the form of a body and the other of which is in the form of a rod or shaft, a wiper or scraper for the rod or shaft comprising a length of elastic material fashioned into annular form with at least one complete convolution, said convolution lying in a plane substantially perpendicular to the rod or shaft axis, or elastomer body embracing the outer peripheral portions of said convolution, means providing a cavity in the body working element for receiving the elastomer body, the normal diameter of the convolution being different than the diameter of the rod or shaft whereby the same yieldably circumflex the rod or shaft to wipe or scrape it in its movements, and shoulder means positioned in proximity to but axially spaced from a side of said convelution and radially spaced from the elastomer body against which said convolution may abut when shifted incident to wiping and scraping forces.

2. The combination defined in claim 1 wherein the cavity in the working body element has an area less than that required by the normal elastomer body so that the elastomer body is maintained in distorted condition and tightly engages said convolution in radial and axial directions.

3. In combination with two relatively reciprocable elements one of which is in the form of a body having means defining a cavity with axially spaced side walls and the other of which is in the form of a rod or shaft, a scraper comprising, means forming a radially expansible annulus having a peripheral portion in scraping engagement with said rod or shaft, said annulus having another peripheral portion spaced radially from the first mentioned peripheral portion thereof, an elastomer body having portions disposed within said cavity and engaging around said other peripheral portion of said annulus, said portions of said elastomer body being contained in axially compressively distorted condition between said side walls of said cavity so that said elastomer body exerts force in a radial direction on said annulus for holding it firmly in scraping engagement with said rod or shaft, at least one of said side walls extending toward said rod or shaft beyond the radial limits of said other peripheral portion of said annulus for supporting said annulus against axial thrust incident to its being engaged by matter on said rod or shaft which is to be removed.

4. In combination with two relatively reciprocable elements one of which is in the form of a body having means defining a cavity with side walls and the other of which is in the form of a rod or shaft, a scraper comprising, means forming a radially expansible annulus, a ring of elastomer material having an annular groove and portions radially displaced from said groove, said annulus having portions disposed within said groove and a peripheral portion in scraping engagement with said rod or shaft, said portions of said elastomer ring being disposed within said cavity and being contained in axially compressively distorted condition between said side walls thereof so that said elastomer ring exerts force in a radial direction on said annulus for holding it firmly in scraping engagement with said rod or shaft, at least one of said side walls extending toward said shaft a distance sufficient so that exteriorly engages at least portions of the grooved elastomer material within which said annulus is disposed so that said one side wall through said elastomer material supports said annulus against axial thrust incident to its being engaged by matter on said rod or shaft which is to be removed.

5. In combination with two relatively reciprocable elements one of which is in the form of a body having means defining a cavity with side walls and the other of which is in the form of a rod or shaft, a scraper comprising, means forming a radially expansible annulus, a ring of elastomer material having an annular groove and portions radially displaced from said groove, said groove having radially extending sides and a bottom, said annulus having portions disposed within said groove with said sides of said groove engaging opposite faces of said annulus and said bottom of said groove engaging against a peripheral portion of said annulus radially spaced from the first mentioned peripheral portion thereof, said portions of said elastomer ring having an axial extent in unstressed condition which is greater than the distance between said side walls of said cavity, said portions of said elastomer ring being disposed within said cavity and being contained in axially compressively distorted condition between said side walls thereof so that said elastomer ring exerts force in a radial direction on said annulus for holding it firmly in scraping engagement with said rod or shaft, at least one of said side walls of said cavity exteriorly engaging one of said sides forming said groove and said compressively distorted portions of said elastomer being immediately adjacent said side so that said side, side wall, and portions of said elastomer ring cooperate to support said annulus against axial thrust incident to its being engaged by matter on said rod or shaft which is to be removed.

6. In combination with two relatively reciprocable elements one of which is in the form of a body having means defining a cavity with axially spaced side walls and the other of which is in the form of a rod or shaft, a scraper comprising, means forming a radially expansible annulus having one peripheral portion in wiping engagement with said rod or shaft and another peripheral portion radially spaced therefrom, a ring of elastomer material having a portion extending radially into engagement with one side wall of said cavity and an axial face of said annulus, said elastomer ring having an axially extending portion engaging around said other peripheral portion of said annulus and being contained in axially compressively distorted condition by the side walls of said cavity so that said elastomer ring exerts force in a radial direction on said annulus for holding it firmly in scraping engagement with said rod or shaft, said one side wall of said cavity and said radially extending portion of said elastomer ring extending radially toward said rod or shaft through a major part of the radial extent of said annulus, so that said one side wall through said portion of said ring supports said annulus against axial thrust incident to its being engaged by matter on said rod or shaft which is to be removed, and means operative to secure said annulus in engagement with said radially extending portion of said elastomer ring.

7. The combination defined in claim 6 wherein said elastomer ring has an annular groove in which one side wall is formed by said radially extending portion of said ring, the other side wall of said groove being formed by another radially extending portion spaced axially from the first, and engaging the other axial face of said annulus for securing it in engagement with the first mentioned radially extending portion of said ring.

8. The combination defined in claim 3 wherein said annulus has an axial face and said elastomer body comprises a ring surrounding said other peripheral portion of said annulus, said one side wall of said cavity engaging against said axial face of said annulus for supporting said annulus against said axial thrust.

9. The combination defined in claim 3 wherein said annulus has two oppositely disposed axial faces and said elastomer body is comprised of two rings, one ring being axially compressively distorted between said one side wall of said cavity and one axial face of said annulus, the other ring being axially compressively distorted between the other side wall of said cavity and the other axial face of said annulus, each ring having an axially extending portion engaging around said other peripheral portion of said annulus.

10. The combination defined in claim 3 wherein said elastomer body has other portions which extend radially away from the first mentioned portions thereof and sealingly engage against said rod or shaft.

11. The combination defined in claim 3 wherein said cavity-defining means comprising means forming an annular channel member having a generally U-shaped cross section containing said portions of said elastomer body and said annulus to provide a sub-assembly and means securing said channel member to said body with said annulus in scraping engagement with said rod or shaft.

References Cited in the file of this patent

UNITED STATES PATENTS

| | | |
|---|---|---|
| 2,173,247 | Bott | Sept. 19, 1939 |
| 2,368,380 | Ruzicka | Jan. 30, 1945 |
| 2,566,448 | Heintz et al. | Sept. 4, 1951 |

FOREIGN PATENTS

| | | |
|---|---|---|
| 624,044 | Great Britain | May 26, 1949 |
| 1,037,011 | France | Apr. 29, 1953 |